Figure 1:
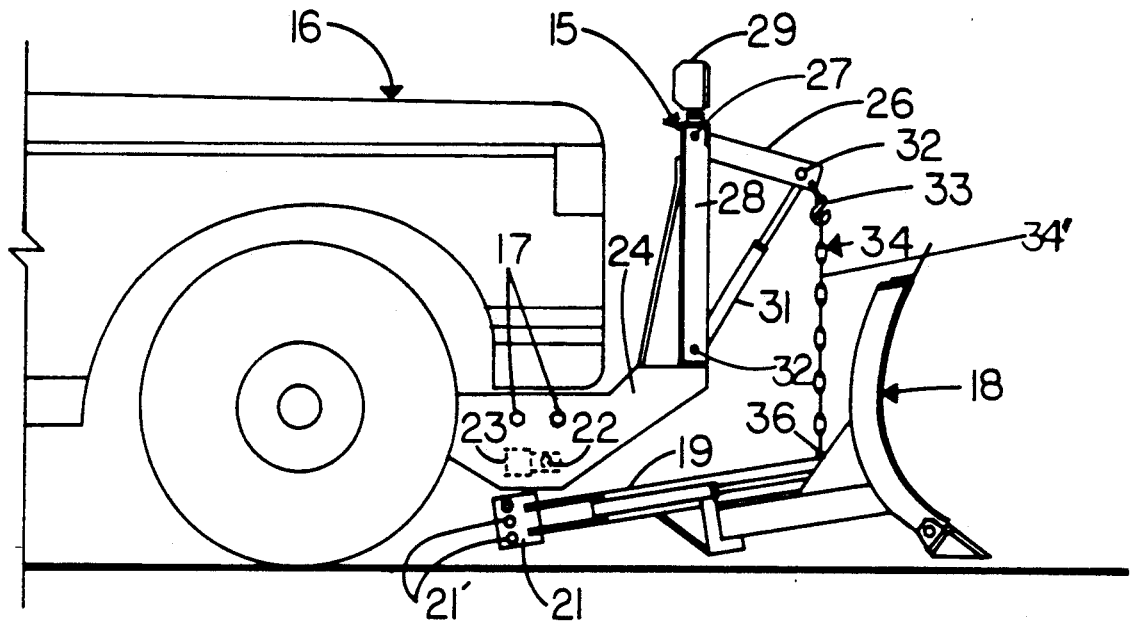

United States Patent [19]

Evans

[11] Patent Number: 5,050,321
[45] Date of Patent: Sep. 24, 1991

[54] SNOW PLOW HITCH PIN ASSISTING MEANS

[76] Inventor: Roy C. Evans, P.O. Box, Round Pond, Me. 04564

[21] Appl. No.: 601,523

[22] Filed: Oct. 23, 1990

[51] Int. Cl.⁵ .............................................. E01H 5/04
[52] U.S. Cl. ........................................ 37/232; 37/236
[58] Field of Search ................. 37/231, 234, 235, 236, 37/117.5, DIG. 12

[56] References Cited

U.S. PATENT DOCUMENTS

| | | | |
|---|---|---|---|
| 3,214,138 | 10/1965 | Jocher et al. | 37/236 X |
| 4,304,056 | 12/1981 | Watson et al. | 37/231 X |
| 4,619,060 | 10/1986 | Knowlton | 37/231 X |
| 4,821,435 | 4/1989 | Pester | 37/231 |

Primary Examiner—Dennis L. Taylor
Assistant Examiner—J. Russell McBee

[57] ABSTRACT

To ease the mounting of a snow plow structure by use of a measured means extending between the attaching structure fixed on a vehicle and its lift chain to bring the hitch pin holes of plow structure push arms into vertical alignment with pin holes on attaching structure as the plow structure is lifted from its center of gravity and in fore and aft balance. Little movement, if any, of the lifted plow structure will be needed to transversely align pin holes for the full insertion of the hitch pins. A single pull cable is connected to two spring actuated hitch pins to pull them from the pin holes on the vehicle mounted attaching structure when connecting the plow structure thereto. Upon release of the pull cable the pins will enter the transversely-aligned pin holes of the structures. All this having been done with little manual effort.

10 Claims, 6 Drawing Sheets

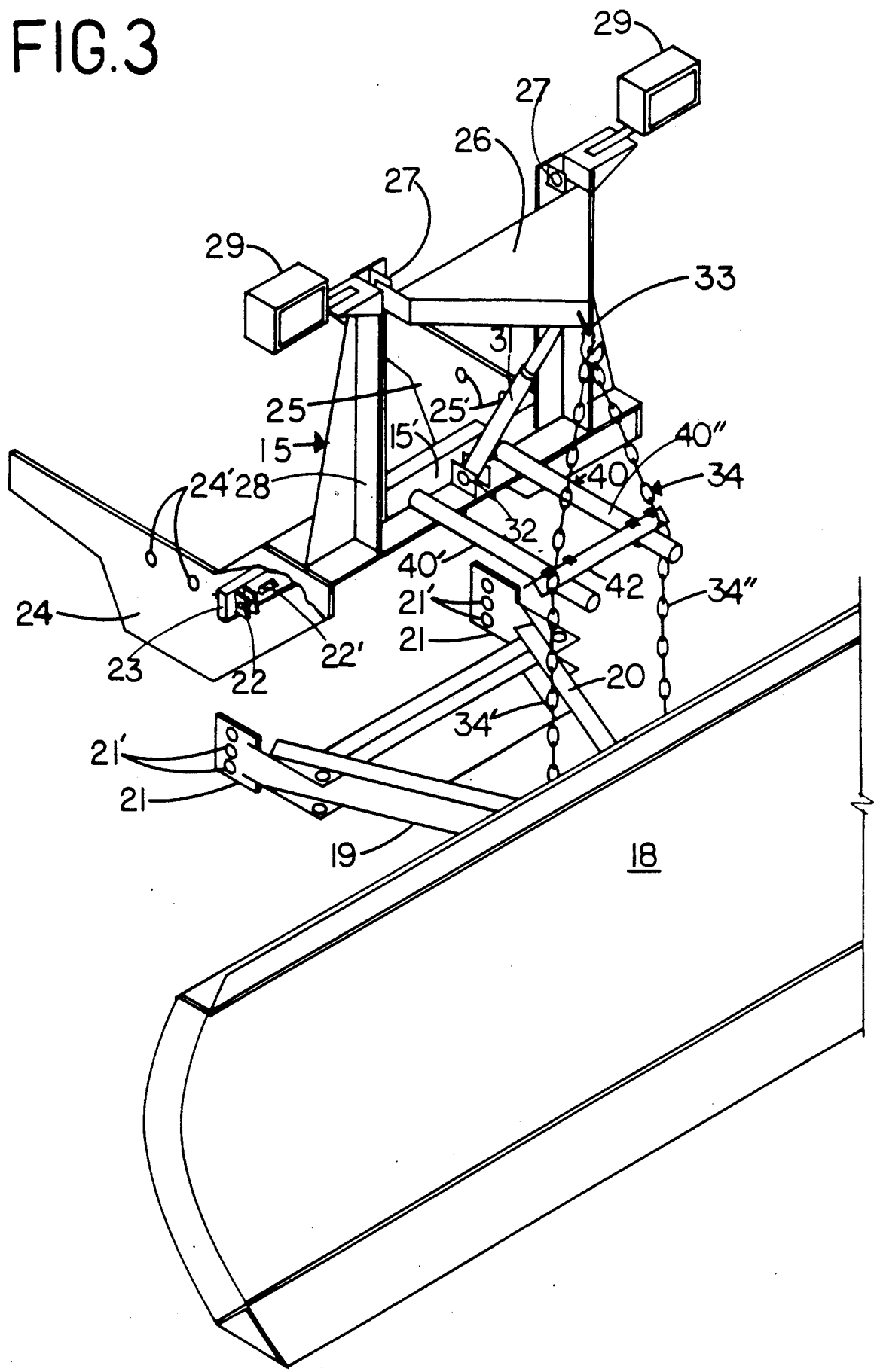

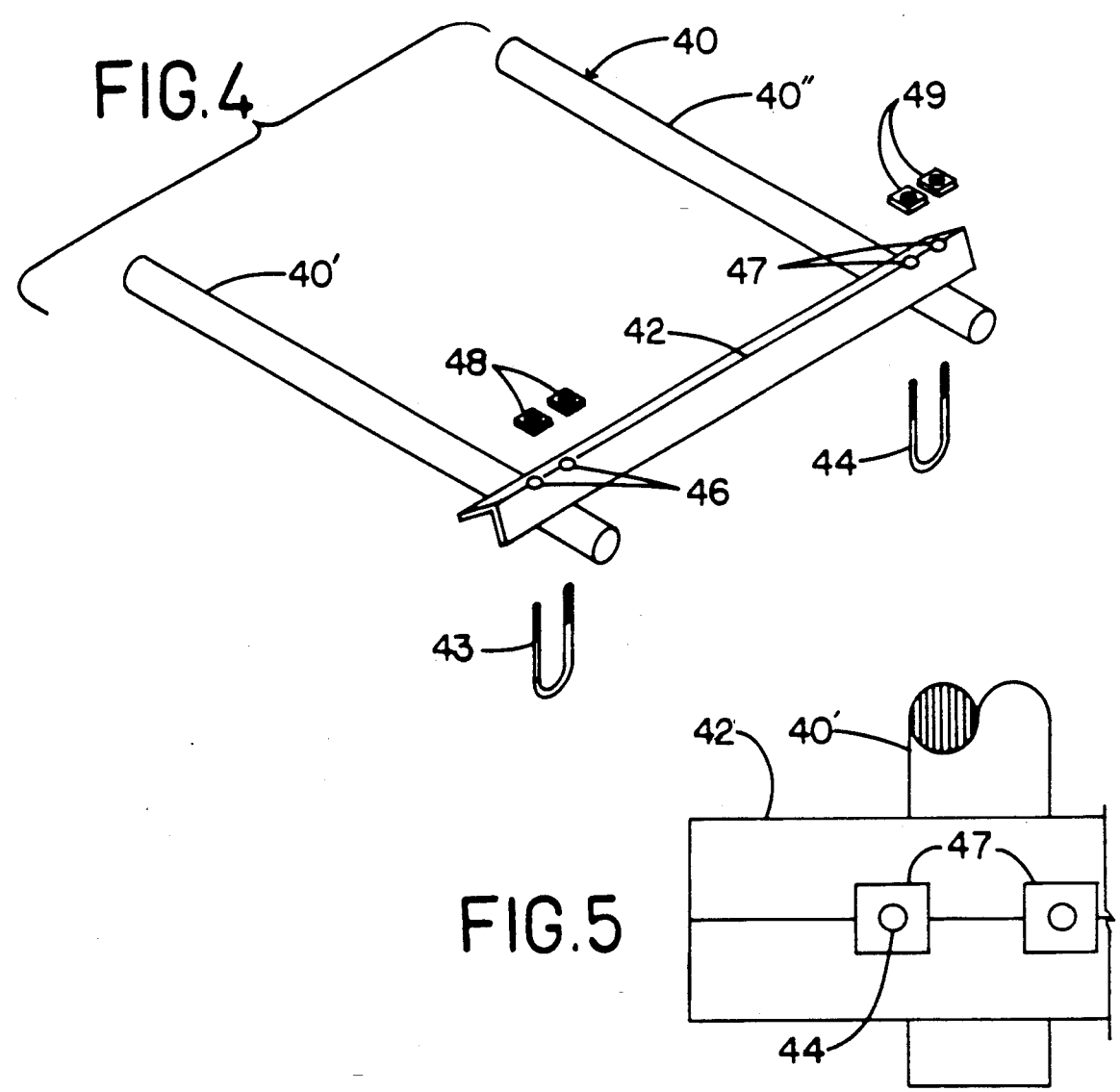
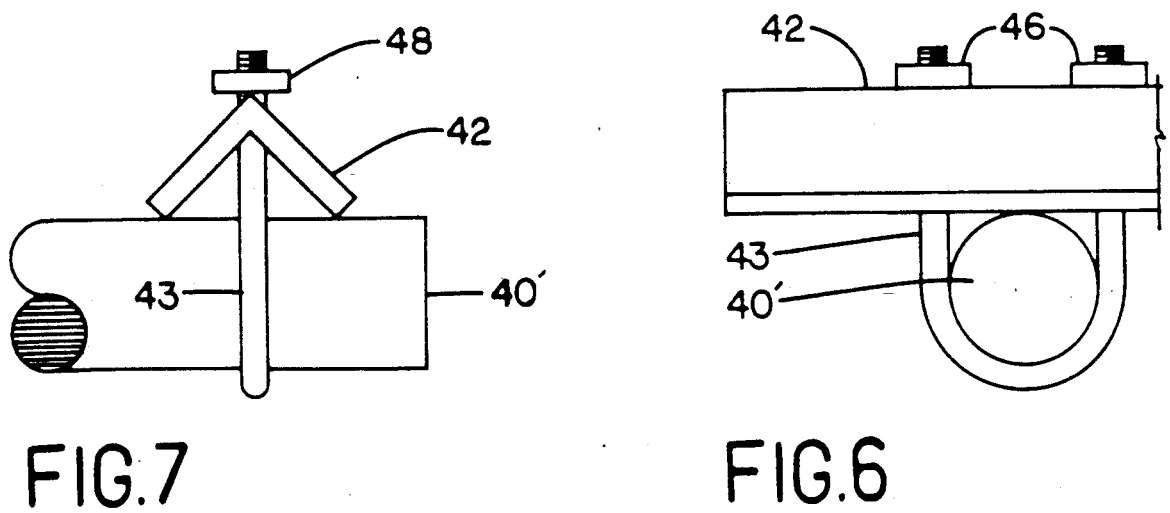

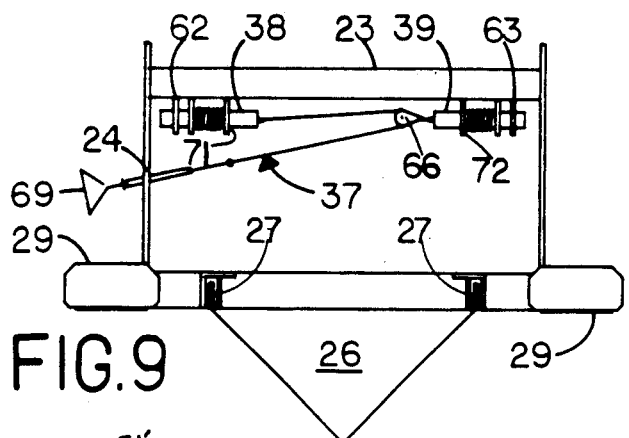
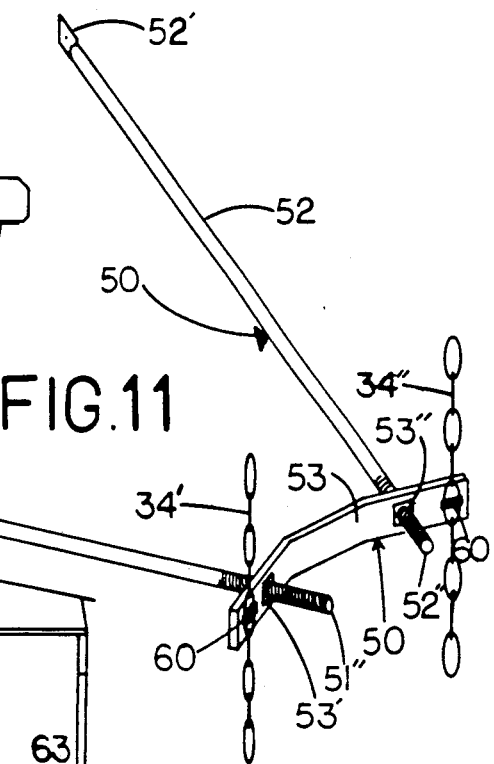
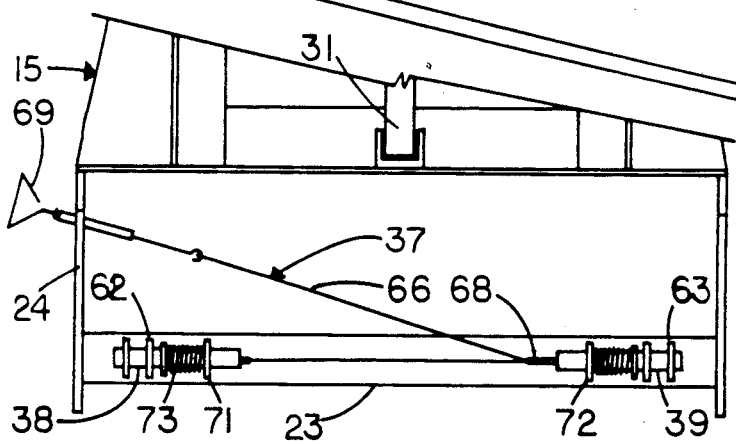
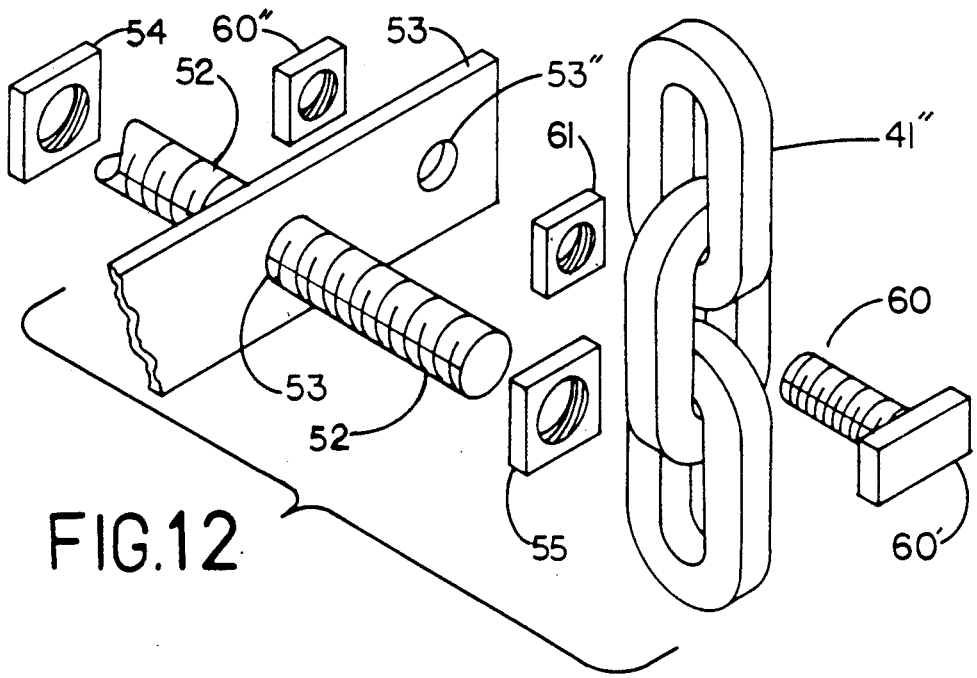

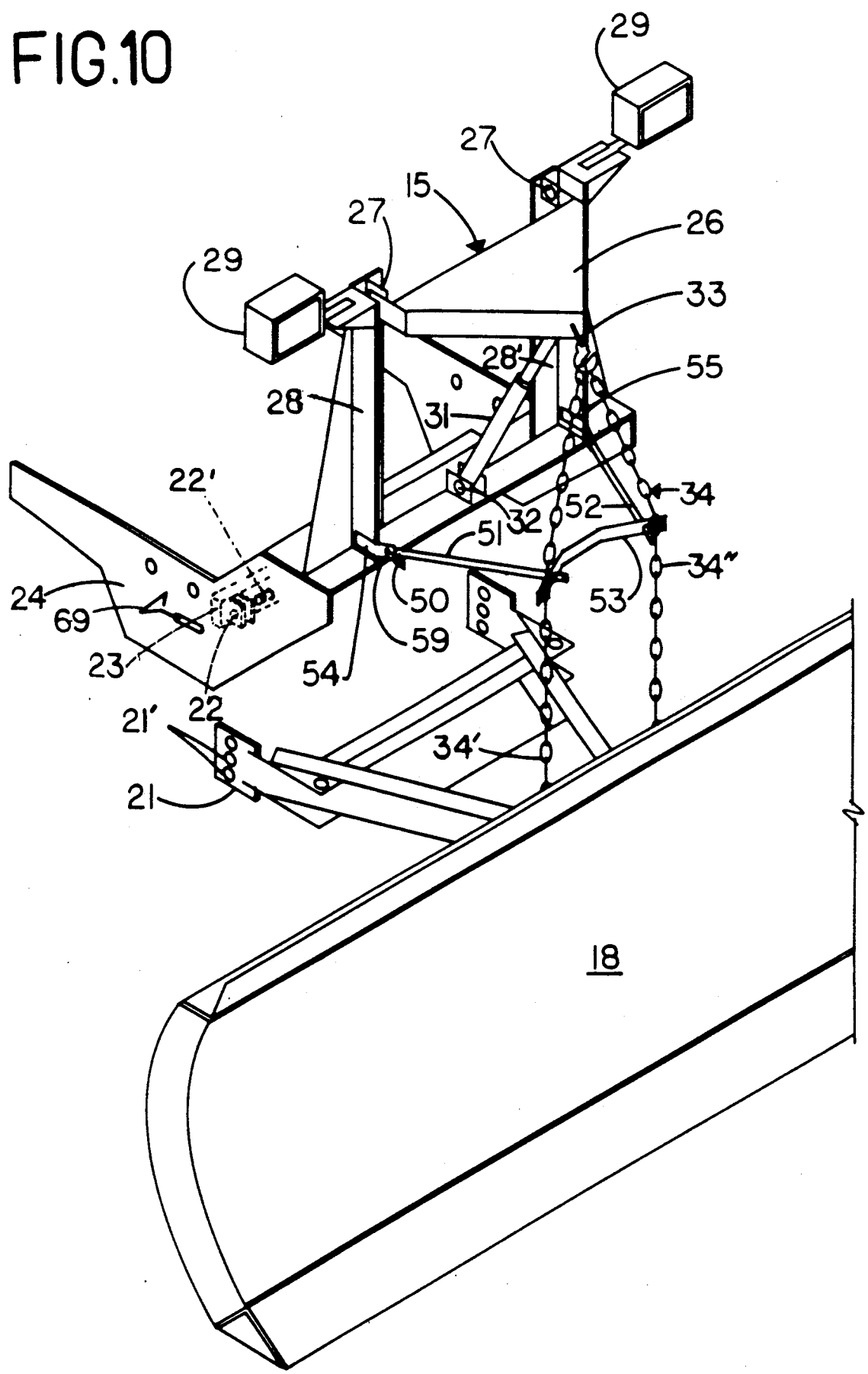

SNOW PLOW HITCH PIN ASSISTING MEANS

This invention relates to a snow plow hitch assisting means to ease the mounting the snow plow upon the front of a vehicle.

Heretofore, snowplow attachments for vehicles require much manual effort to effect the hitching of plow to the vehicle. The lining up of the holes for the hitch to allow for the placing of the hitch pins through them has been difficult and has required much tedium pushing and lifting to finally get the pin holes aligned at each side of the vehicle and the pins inserted. In fact, the hitching operation of the heavy plow is back-breaking and often results in bodily injury. The vehicle must be driven into the plow structure to the exact extent for manual lifting of the plow push arms and proper alignment of holes in the push arms with the pin holes in the plow push beam of the attaching structure on the vehicle.

Heretofore, the snow plow attachment using its hydraulic mechanism with the lift chain in a vertical position, positions the push arms attachment holes aft of the push beam attachment pins making attachment impossible.

GENERAL STATEMENT

To overcome this problem of mounting a plow structure upon a vehicle by the present procedures, a simple device has been provided that can be used or included in the structure to cause the plow structure to be steadied in such a manner and lifted hydraulically for easy connection with the vehicle hitch pin attaching structure on the vehicle. In essence this has been effected with the extending chain intermediate its length over the hook on this hydraulic lift arm so that two laterally spaced chain legs extend for connection with the plow structure at a location to give lateral balance as well as fore and aft balance so that the entire plow structure is lifted in upright balanced manner and hitch pin holes of the two structures in vertical alignment preparatory for insertion of the hitch pins upon the right elevation being reached.

To assure that the distance for keeping the hitch pin holes of the structures vertically aligned while the plow structure is kept in fore and aft balance a length measured device is used in one form as a mere mounting tool and in another form as means built into the equipment and both adapted to extending between the spaced chain legs and cross beam of the attachment but carried upon the vehicle attaching structure to hold the plow structure when raised by the hydraulic mechanism the exact longitudinally measured distance of the alignment hitch pin holes of the laterally-spaced depending chains being at the center of gravity location on the plow structure. Spring-biased hitch pins for pull and release are provided on the vehicle attachment with a hand grip and cable extension to the hitch pins. A pull is made of the hitch pins with one hand while the push arms of the plow structure are easily worked into place with the other hand to put the pin holes into transverse alignment to receive the hitch pins.

OBJECTS OF THE INVENTION

It is thus the principal object of the present invention to provide means for mounting snow plow structures upon vehicles by which use may be made of the hydraulic lift and its chain to suspend the plow structure from its center of gravity for exact vertical alignment of the hitch pin holes of the push arms of the plow structure holes on its vehicle attaching structure on the vehicle.

It is another object of the invention to provide a separate strut-like mounting tool for assisting in the hitching of the plow structure to the vehicle such that when the plow structure is raised free of the ground and balanced about its center of gravity will place the plow structure forwardly a measured distance to vertically align hitch holes of the separable plow structure and the holes on the vehicle attaching structure.

It is still another object of the invention to provide a pull cable hitch pin assembly for use with a self-aligning lift arrangement in assembling a snow plow structure to the attaching structure upon the vehicle that upon the hitch holes of the structure being transversely aligned the connection will be made by simple release of the hitch pins by a single pull cable.

It is still another object of this invention to provide mounting means for attaching plow structures to a vehicle to ensure balance of the plow structure when lifted by the hydraulic lift free of the ground in both transversely and fore and aft directions and to restrain the plow structure against tilting and swinging out of position upon being lifted to make the hitch connection of the plow with the vehicle.

Other objects of the invention are to provide an assisting means for mounting plow structures upon vehicles, having the above objects in mind, which is of simple construction, has minimum parts, inexpensive to manufacture, easy to install, utilizes little space, automatic, effective and efficient in operation.

DRAWINGS

Figure 2:
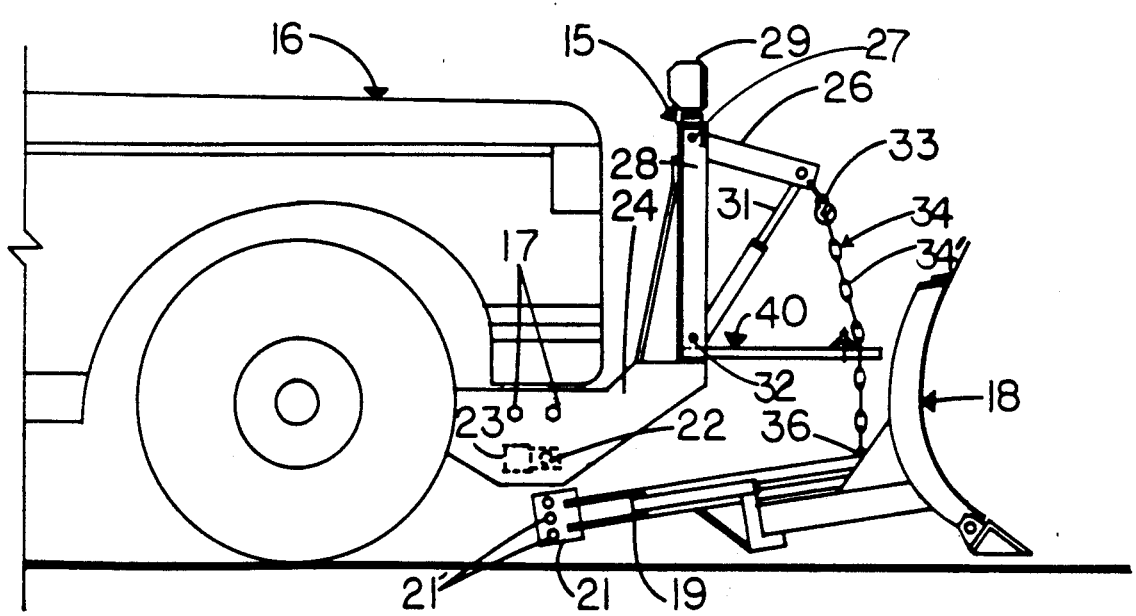
Figure 13:
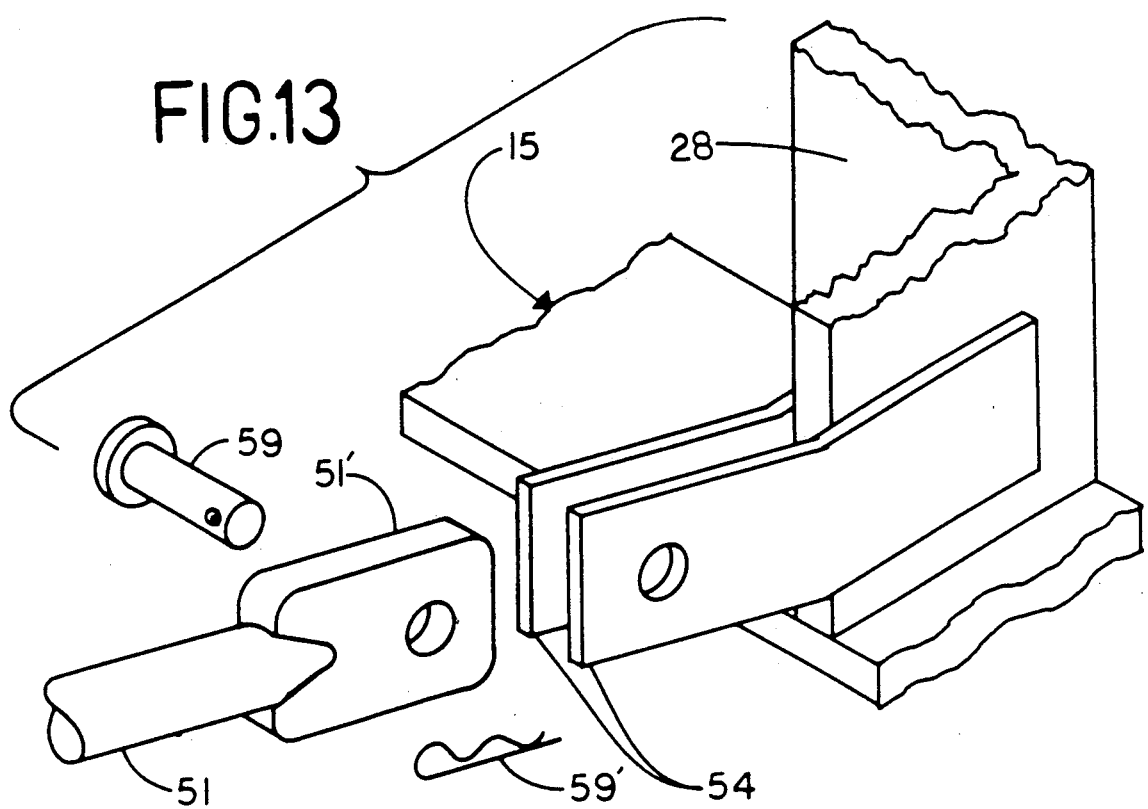

For a better understanding of the invention, reference may be had to the following detailed description taken in connection with the accompanying drawing, in which, FIG. 1 is a side elevational view of a snow plow structure being suspended free by its lift chain from its vehicle attaching structure and showing how it is normally unaligned for hitching with the hitch holes on plow and attaching structures being out of vertical alignment with one another and use of the present devices, not being made, FIG. 2 is an elevational view similar to FIG. 1 illustrating how with the use of the present measured mounting strut tool device engaging two chains legs, the plow structure is lifted evenly and the holes of the structures vertically aligned, for easy hitching with hitch pins, FIG. 3 is an enlarged fragmentary perspective view of a snow plow structure and its attaching structure for use on the vehicle to which the plow structure is releasably hitched and the assisting tool means for the mounting of the plow structure to its attaching structure as a separable tool engagable with spaced chain legs and to hold the plow structure in advance of the vehicle to align the hitch pin holes for easy insertion of the hitch pins, FIG. 4 is an exploded view of the strut assisting tool means being used in FIG. 3 and its several parts being shown in perspective, FIG. 5 is a fragmentary top plan view of one forward chain-engaging side end of the assisting tool, FIG. 6 is a fragmentary forward front elevational view of the tool and, FIG. 7 is a fragmentary forward side end elevational view of the tool, FIG. 8 is a fragmentary elevational view of the vehicle attaching structure and looking upon the hand pull cable hitch pin assembly, FIG. 9 is a fragmentary transverse view looking in plan upon the pull cable hitch pin assembly and the attaching structure, FIG. 10 is an enlarged fragmentary perspective view of snow plow and attaching structures in which the assisting strut tool means is built into the assembly and is herein presented as a modified form of the invention and arranged for use with the depending spaced chain legs of the lift arm chain, FIG. 11 is a perspective view of the built-in assisting means of FIG. 10 removed from the vehicle attaching structure, FIG. 12 is an exploded view of the chain leg attaching parts of FIG. 11 for connecting the same to the mounting tool, to the chain legs FIG. 13 is a fragmentary exploded and perspective view of the vehicle attaching structure looking in perspective on a pivotal connection of one of the strut arms to the attaching structure on the vehicle.

Figure 14:
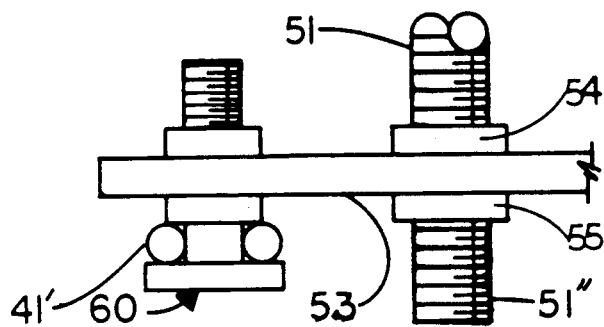
Figure 15:
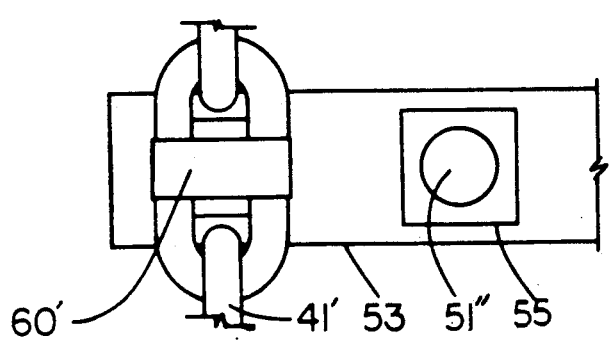
Figure 16:
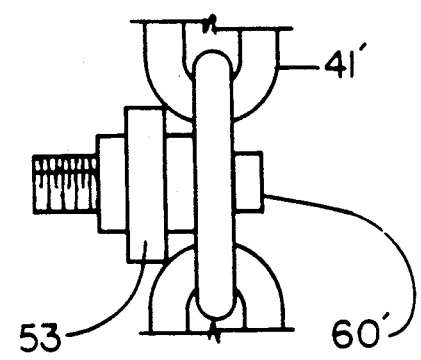

FIG. 14 is a fragmentary top view of the chain attaching end of the built-in strut assisting means, FIG. 15 is a fragmentary front elevational view showing of FIG. 14, and FIG. 16 is a fragmentary side elevational view of the showing of FIG. 14.

In FIG. 1 there is shown an illustration of the standard snow plow mountings for vehicles. The arrangement includes an attaching structure 15 that is fixedly mounted upon the forward end of a vehicle 16 by attaching bolts 17 and a snow plow moldboard structure 18 that is detachably connected by its rearwardly-extending push arms 19, 20, one at each side of the plow structure to the attaching structure 15 on the vehicle 16. Each push arm 19, 20 has a hitch pin plate 21 of its rear in which there are three vertically-spaced holes 21' therein through any one of which a hitch pin 22 will be extended into a hole 22 in a push beam assembly 23 of the vehicle attaching 15. There will be a similar hitch pin connection made at the other side of the plow and vehicle. It will be noted in FIG. 1 that with the plow structure 18 lifted, the hitch pin mounting holes 21' of push arm pin plate 21 are not in vertical alignment with holes 22 of transverse push beam assembly 23 on the attaching structure 15.

In contrast, as shown in FIG. 2, utilizing the present assisting means, to be described more in detail, that as the plow structure 18 is lifted the holes 21' in push arm pin plate 21 are in vertical alignment with hole 22 in the push beam assembly 23.

The vehicle attaching structure 15 includes parallel attaching plates 24, 25 with holes for accommodating the attaching screws 17 that fasten the attaching structure 15 and the entire snow plow assembly to the vehicle 16 and a triangular-shaped lift arm 26 pivotally connected at 27 to the upper end of a vertically-extending structure 28, on the upper end which lamps 29 are supported high enough to be seen above the lifted plow. The pivot arm 26 is worked by a hydraulic actuator 31 pivotally connected at its lower end to attaching structure 15 and to the lift arm by a pin 32. On the outer end of the triangular-shaped lift arm 26 is a hook 33 over which a chain 34 with chain legs 34', 34" as in FIG. 1 is connected for detachment therefrom but which extend to the center of gravity at 36 on the plow structure 18 for connection therewith to be assembled to the vehicle attaching structure 15.

In FIG. 1, with the lift arm 26 raised to position shown, the plow structure 18 is held in full suspension but not in definite vertical alignment of holes 21' in the push arm plate 21 with holes 22 on the hitch pin push beam connection 23, to make easy the attachment of the structures with hitch pins on the attaching structure 15. Because of the great weight and bulk of the plow structure 18 it is difficult to move the plow structure even but a trifle, less inches numbering several in most instances. The plow structure 18 will not have been lifted true enough for making for easy connections by hitch pin means on the attaching structure. Often more than one person is needed for effecting the ultimate hook-up. The operator can hardly make the hitch connection of solitary pins by himself. The hitch projections on the push beam 23 are pairs of forwardly-extending lugs containing the holes 22 into which the attaching push arm plates 21 are extended and through which the single hitch pins 22' are extended through these aligned holes. A special pull cable operated hitch pin assembly has been provided with the present hitch assisting means that will later be described in detail.

In FIG. 2, use is made of the hydraulic lift to raise the plow structure and at the same time with the present assisting means the plow is held forward definite measured horizontal distance from the vehicle attaching structure 1 such that the plow structure while in balance from its center of gravity will have its hitch holes 21' in the push arm plate 21 in vertical alignment with hitch holes 22 of the vehicle attaching structure. All hitch pins holes are thereby transversely aligned to receive as well hitch pins 38 and 39 of the pull cable dual hitch pin assembly 37.

The feature of this invention will be readily apparent on reference to FIGS. 2 and 3 wherein the removable measured chain-engaging thrust device 40 according to the one form of the present invention has been used. Like numbers will apply as have been applied in connection with FIG. 1. This measured thrust device 40 is shown more in detail in FIGS. 3 to 7 inclusive. The spread chain 34 is used having separated on dual chain legs 34' and 34" to depend from the lift hook 33 of the hydraulic lift arm 26 operated by the hydraulic lift cylinder 31 on the vehicle attaching structure 15. The thrust device 40 abuts forward part of the vehicle attaching structure at 15', FIG. 3, and comprises two laterally-spaced parallel rods 40' and 40" held apart by a transversely-extending member 42 of angle section which is adjustably connected along the top of the rods and retained in place to alter the effective length of the device 40 by U-bolts 43 and 44 extending respectively upwardly from and about the respective rods 40' and 40", through holes in the angle section transverse member 42, in pairs as at 46 and 47 and respectively secured by respective nuts 48 and 49. The ends of the transverse member 42 extend beyond the parallel rods 40' and 40" to respectively accommodate the respective chain legs 41' and 41" in a manner best shown in FIG. 3 and held separated by outer ends of the rods.

In further viewing FIG. 2, it will be seen that the chain legs 41' and 41" of chain 41 and the plow structure 18 have been thrust forwardly on the plow structure 18 being raised and that on balance the hitch pin holes 21' in the plow push arm plates 21 will be in vertical alignment with the hitch pin holes 22 of parallel lug projections on the vehicle attaching structure 15. The hitch pins 38, 39 of pull cable hitch pin assembly 37 upon further lifting of the plow structure are so located that any difficult shifting of the suspended plow structure 18 will be unnecessary to make the hitch pin connection with hitch pins 38 and 39. With exact longitudinal measurement of the thrust device 40 being had the plow structure has been automatically adjusted for fore and aft alignment of the hitch pin holes. Once the mounting of plow structure has been effected, the thrust device 40 is then removed and may be used with other similar vehicle snow plow assemblies.

Referring to FIGS. 10 to 16 inclusive, there is shown a modified form of the invention in which the thrust means is built-in and made a part of the vehicle attaching structure assembly and once adjusted to the effective measured length is fastened to the spread chain legs 41' and 41" and is kept thereon. The spread chain 41 depends from the hook 33 on the triangular-shaped lift lever 26 with the two chain legs 41' and 41" and held spread by a thrust means 50 built into snow plow assembly and connected between the vehicle attaching and plow structures. This thrust assisting means 50 comprises thrust rods 51 and 52 flattened respectively at their respective ends at 51' and 52' for pivotal connection with respective lugs 54 and 55 on respective spaced upright members 28, 28' and retained by headed pivot pins 59 and their cotter pin 59', FIG. 13, with a separating member 53 angled to accommodate threaded outer ends 51" and 52" of the rods 51 and 52 that are drawn together at an angle to be vertically aligned respectively with the separated lift chain legs 41' and 41" connected to the plow structure 18 and bolt means 60 with elongated head 60' for fixing the chain link leg to the separating member 53 in a rigid manner.

The rods 51 and 52 are adjustably connected by their outer ends to the separating member 53 and in a manner best seen in FIGS. 12, 14, 15 and 16. The forward opposite ends of the respective thrust rods 51 and 52 are respectively threaded at 51" and 52". The adjustable connection of the rods 51 and 52 to the separating member 53 is effected by extending the respective threaded ends 51" and 52" through respective spaced holes 53' and 53" in the separating member 53 and each with adjustable nuts 54 and 55, after measurements are taken for effective distance and the installation of the thrust means 50 having been made.

For the connection of the separating member 53 to the chain legs, a special arrangement has been provided that comprises bolt means 60 having an elongated cross head 60' to be accommodated between chain links when the bolt is extended through the chain for connection through holes 53" in the respective outer ends of the separating member 53. In order that the chain leg will be accommodated upon the face of the separating member 53, a spacer nut 61 is placed upon each bolt shank and at the inner side of the chain leg and the bolt shank extended through the hole 53" of the separator 53 and made secure by a threaded nut 60" tightened against the back face of the separating member 53. The chain leg 51' at the opposite side end of the separating member 53 will be made in the same manner as just described.

With the installation of the thrust assisting means 50 fully made the plow structure 18 will be lifted and held in a balanced manner so that hitch pin holes 21' in the push arm attaching plates 21 will be exactly vertically aligned with the forwardly-extending pairs of spaced hitch projections 62 and 63 upon push beam 23, FIG. 9. Corresponding holes 21' of the plates 21 and spaced hitch projections 62 and 63 transversely match one another to accommodate hitch pins 38 and 39 of a pull cable hitch pin assembly 37. A pull cable 66 is extended over a pulley 68 on a hitch pin 39 and extended to hitch pin 38 so that with a pull of the cable by a hand grip 69 extending from the side plate 24 of the vehicle attaching structure 15 both hitch pins 38 and 39 are pulled to allow the push arm plates 21 to enter the projections 62 and 63 for transverse alignment of their pin holes. The pins 38 and 39 respectively extend through stop projections 71 and 72 on the transverse push beam 23 against which compression return springs 73 and 74 are compressed when the pins 38 and 39 are pulled to allow the hitch projections 62 and 63 to receive the push arm attaching plates 21 of the plow structure 18. The hinge pins 38 and 39 may extend through any of the series of three vertically-spaced hitch holes 21' in the push arm hitch plates 21.

It should now be apparent that a very effective and efficient arrangement has been provided for easing the labor of mounting snow plow structures to their attaching structure upon the vehicle. The carrying out of such mounting has been actually made so simple that an 8-year old child made the connection upon a prototype assembly thereby making for an actual reduction to practice of this invention. It has worked with surprising ease.

While various changes may be made in the detail construction, it shall be understood that such changes will be within the spirit and scope of the present invention as defined by the appended claims.

What is claimed is:

1. In combination, a vehicle having a main frame, a snowplow assembly adapted to be fixedly secured to the vehicle frame and a plow structure adapted to be detachably secured to the vehicle attaching structure by hitch pins for pivoted adjustment from the ground, said vehicle attaching structure having a hydraulic lift arm, a lifting chain with laterally spaced two chain legs connected between the lift arm and the plow structure adjacent its center of gravity to establish fore and aft balance when lifted free of the ground, said vehicle attaching and plow structures having hitch pin holes to be placed in transverse alignment with one another to pivotally attach the plow structure to the vehicle attaching structure with the insertion of the hitch pins and measured thrust hitch pin assisting means extending between vehicle attaching structure and its lift chain to press forwardly thereupon and to align the pin holes of the plow structure with the pin holes of the vehicle attaching structure as the plow structure is lifted in suspension and free from the ground, whereby to make for easy insertion of the hitch pins between aligned holes of the plow and vehicle attaching structures.

2. The combination as defined in claim 1 and said measured hitch pin assisting means being adjustable in length for best use in the assembling of the plow structure upon the attaching structure.

3. The combination as defined in claim 2 and said lifting chain being connected intermediate its length to the pivot hydraulic lift arm and equal leg chain lengths connected to the plow structure at transversely spaced points in a transverse line through the fore and aft center of gravity and said assisting means including a transversely-extending separator engaging the equal leg chain lengths and thrust rods respectively adjustable connected to the opposite ends of the separator.

4. The combination as defined in claim 3 and said thrust rods being abuttingly retained and removably held as a unit by the snow plow assembly and removable once the hitch connection has been effected.

5. The combination as defined in claim 4 and said transversely-extending separator being of angle section and resting by its flange side edges upon the top of the rods and releasable U-bolts assemblies at the respective opposite ends of the transverse-extending separator extending from under the rod and through holes in the separator whereby upon a release of the U-bolts the separator may be adjusted upon the rods to change their effective length for engagement with lifting chain legs.

6. The combination as defined in claim 5 and the ends of the transverse-extending separator extending outwardly of the thrust rods and the lifting chain legs being contained outwardly with the intersections of the separator and the thrust rods.

7. The combination as defined in claim 1 and said hitch pin assisting means including thrust rods oppositely-disposed from each other and pivotally connected to the vehicle attaching structure for vertical movement, a separator connected between the forward ends of the rods and means for securing the lifting chain legs to the opposite ends of the separator.

8. The combination as defined in claim 7 and the forward ends of said thrust rods being threaded and extending through the separator and adjustable nuts upon the threaded ends of the thrust rods to vary the effective length of the assisting means.

9. The combination as defined in claim 8 and said chain leg securing means comprising a bolt extending through a chain link and having a head adapted to extend between links and across the one chain link, a spacer carried on the bolt shank to space the chain leg from the face of the separator, and the bolt shank extending through the separator and a nut securing the bolt, chain leg and spacer to the face of the separator.

10. The combination as defined in claim 1 and a pull cable joint spring hitch pin means carried by the attaching structure for simultaneously releasing the hitch pins together.

* * * * *